United States Patent [19]

Forberg et al.

[11] 4,281,885

[45] Aug. 4, 1981

[54] LINE TELECOMMUNICATIONS CABLE END SYSTEM

[75] Inventors: Horst Forberg; Wolfgang Radelow, both of Berlin, Fed. Rep. of Germany

[73] Assignee: Krone GmbH, Berlin, Fed. Rep. of Germany

[21] Appl. No.: 18,896

[22] Filed: Mar. 9, 1979

[30] Foreign Application Priority Data

Mar. 16, 1978 [DE] Fed. Rep. of Germany ....... 2811812

[51] Int. Cl.$^3$ ............................................ H01R 15/14
[52] U.S. Cl. ................................................. 339/14 R
[58] Field of Search ................ 339/14 R, 14 L, 14 P, 339/76, 75 M, 75 MP, 79, 97 R, 97 P, 98, 99 R, 103, 276 A, 136 R, 136 M, 137, 139 R, 139 C, 140 C, 143 R

[56] References Cited

U.S. PATENT DOCUMENTS

| | | | |
|---|---|---|---|
| 3,237,146 | 2/1966 | Barker | 339/14 P |
| 4,113,337 | 9/1978 | McKee | 339/75 M X |
| 4,181,384 | 1/1980 | Dola et al. | 339/14 R |

Primary Examiner—John McQuade
Assistant Examiner—DeWalden W. Jones
Attorney, Agent, or Firm—Weingarten, Maxham & Schurgin

[57] ABSTRACT

A line telecommunications cable end system which is particularly suitable for installation in a rack, such as a casing, for supporting and fixing a lead-in cable end and for mounting terminal and/or isolating strips. The system comprises at least one pair of spaced, parallel earthing strips which each have a row of tags formed integrally on the top thereof. The tags extend through the end face of a corresponding number of terminal or isolating strips with LSA contacts and are of such a length that they can contact associated equipment such as a surge diverter.

13 Claims, 9 Drawing Figures

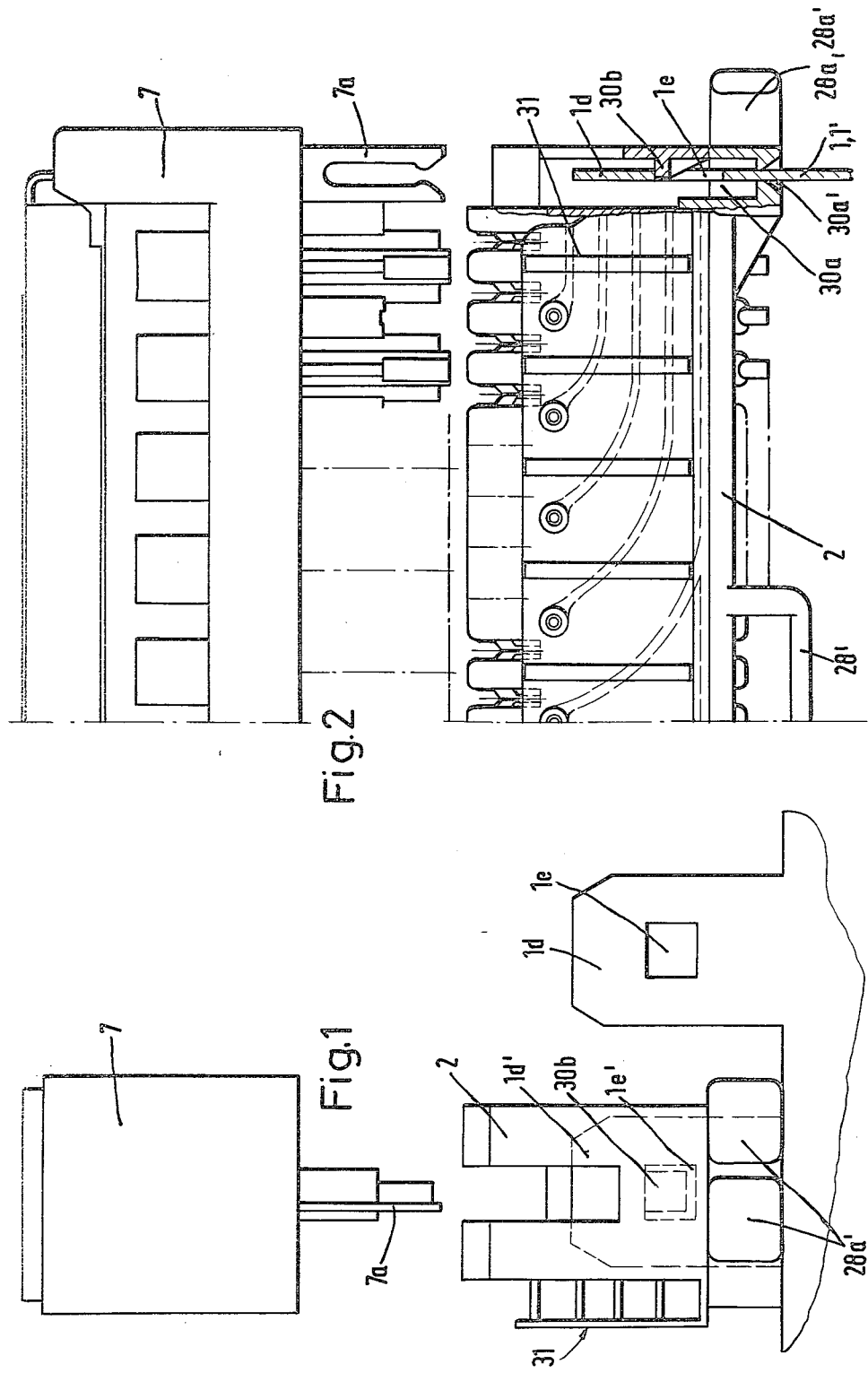

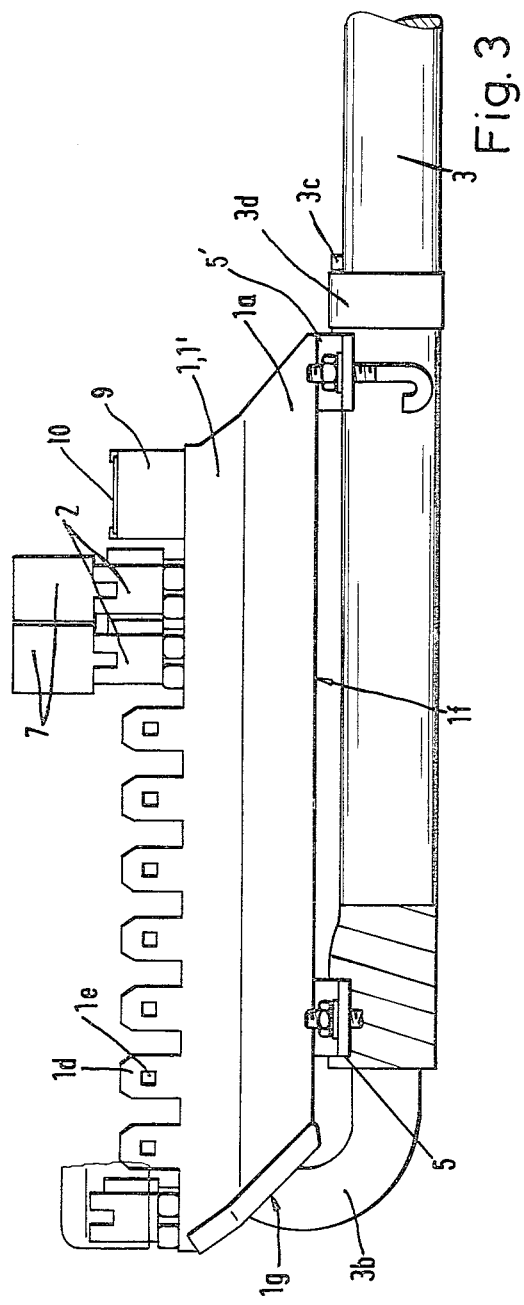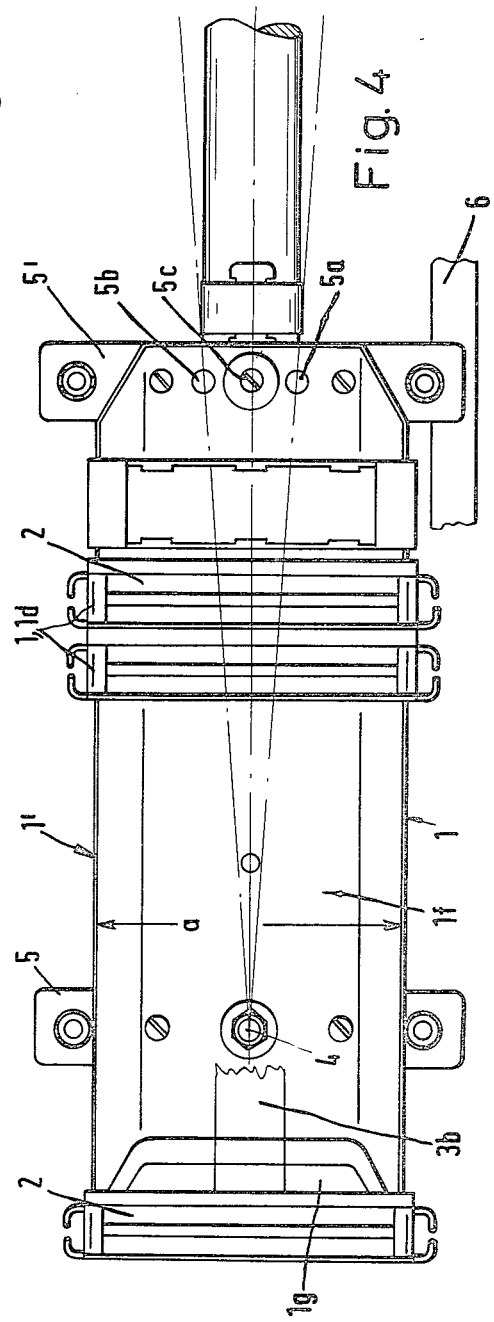

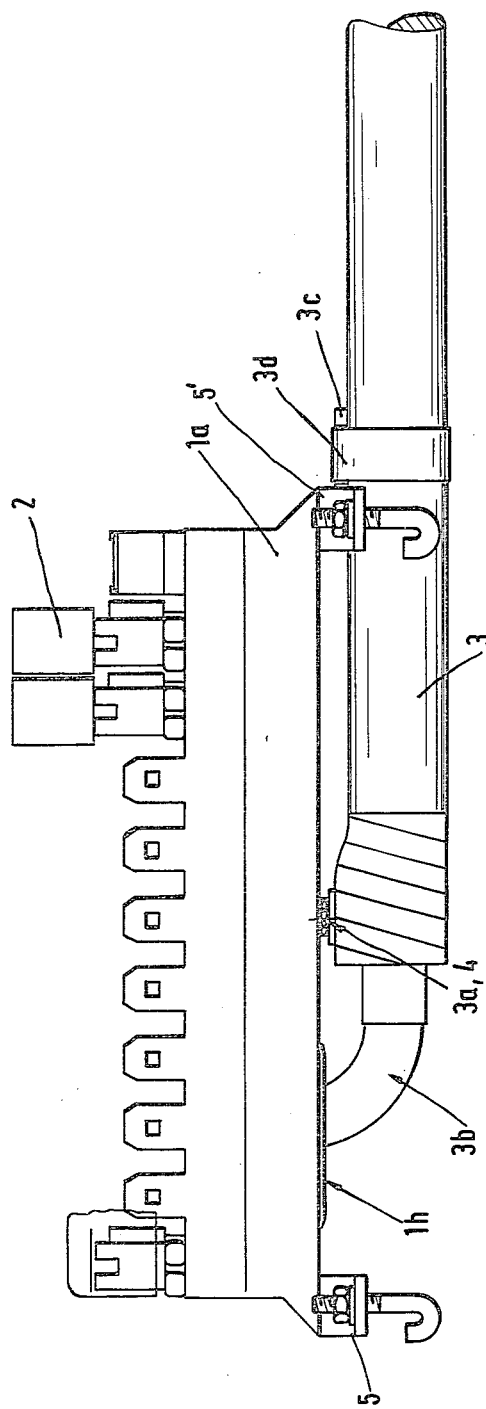
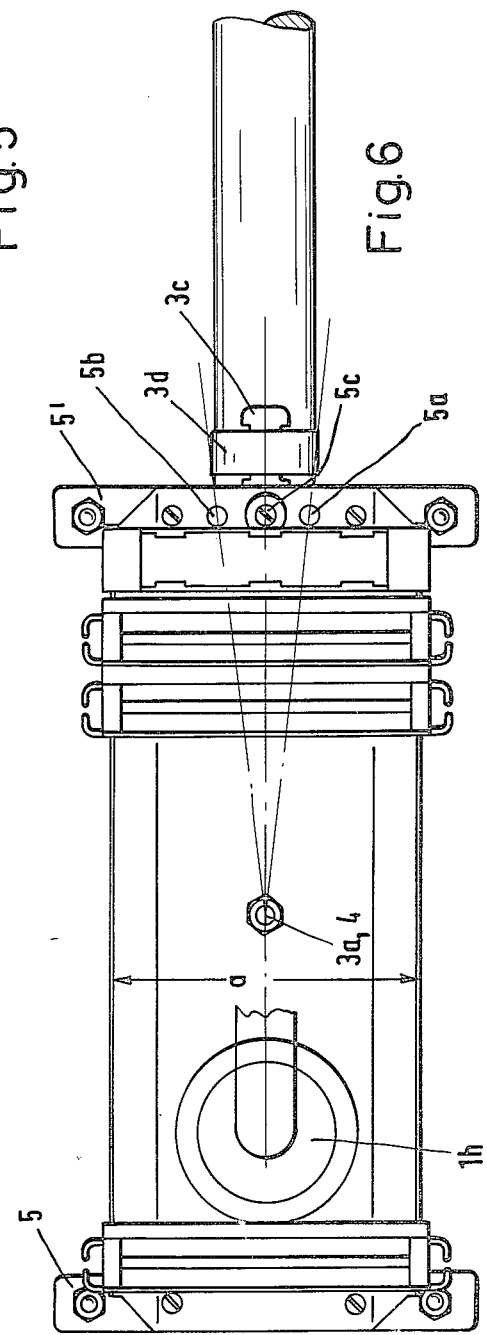

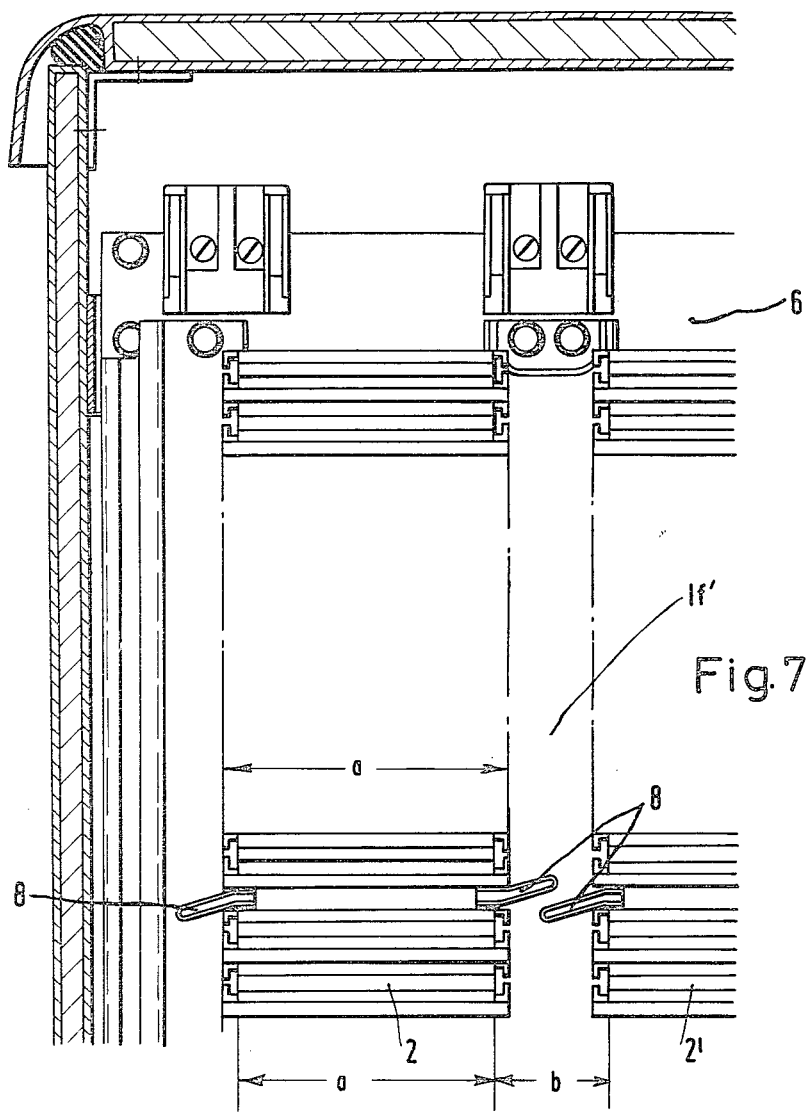
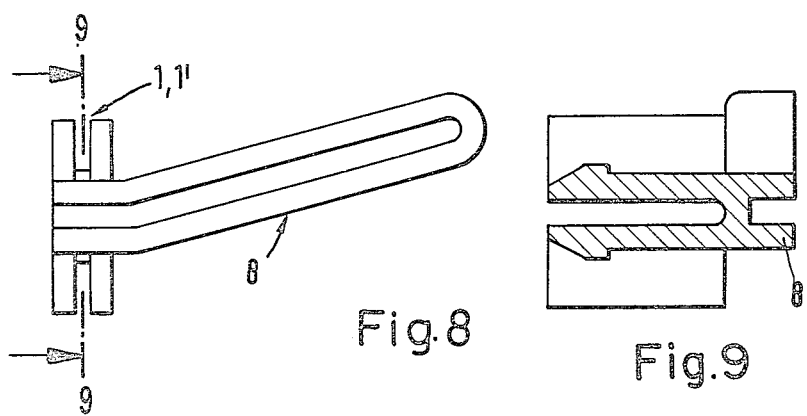

LINE TELECOMMUNICATIONS CABLE END SYSTEM

DESCRIPTION

This invention relates to a line telecommunications cable end system, preferably for installation in a rack or the like e.g. in a casing, for supporting and fixing the lead-in cable end and for mounting terminal and/or isolating strips.

Telecommunications cable end systems in which a specific number of terminal strips is bolted on a metal frame have been known for many years. The or each cable is held on the frame by cable clips. These cable terminal systems are fitted to racks mounted on walls or in cable distribution boxes.

In comparison with this prior art, an object of this invention is to provide a novel cable end system which is simple to manufacture and easier to fit and handle for wiring up the terminal strips mentioned hereinbefore in accordance with the latest terminal technology.

To this end, according to the invention, the cable end system comprises at least one pair of parallel earthing strips disposed in spaced relationship and having a row of tags formed integrally thereon on the top and extending through the end face of a corresponding number of terminal or isolating strips with LSA contacts, the tags being lengthened so that they also contact any fitted extra equipment such as a surge diverter. An "LSA" contact is a known solderless and non-screwed self-stripping contact of the type which simultaneously exposes the conductor core and brings it into metallic contact when the insulated conductor is squeezed.

Additionally the system may include the following features:

1. Each tag on the earthing strips extending through the end face of the strips has a cut-out above the guide slot, said cut-out engaging in a snap-action device of the strips so that the top end of the tag is fixed for engagement with the earth contact of the extra equipment.
2. The earthing strips are connected by a common-bottom wall to form a sheet-metal trough of substantially U-shaped cross-section open at the end faces and top.
3. The width of the sheet-metal trough corresponds to the distance between the end face slots of the terminal and/or isolating strips, and
4. The trough has at the bottom a fixing means for mounting and contacting the screened end of the lead-in cable and a wide opening or a wide bore in the bottom wall with internal edge protection to receive the free cores of the cable.

Important features and aspects of the invention are indicated in the other sub-claims. In addition, the novel cable end system advantageously solves a number of other problems as follows:

1. It can accommodate a given number of terminal strips (e.g. 10) with LSA contacts and earth contacts.
2. The earth connection can run on from the terminal strip to the earthed rack, e.g. of a cable distribution casing, via the metal casing of the cable end system.
3. The width-wise fixing dimensions are the same as the known cable dividing boxes.
4. The cable end can be swung sideways at the bottom cable fixing point.
5. An identification frame with an identification plate can be fitted.
6. A mounting plane for the terminal strips is obtained from the cable guidance system.
7. The cable end system casing is free from torsion.

Four embodiments of the invention will be described now by way of example only with reference to the drawings wherein:

FIG. 1 is a plan view of part of an earthing strip with a visible tag and its cut-out, and a second tag to which a terminal strip has been fitted, and above this a plan view of one end of a surge diverter magazine with its earth contact;

FIG. 2 is a side elevation of part of each of the following: an earthing strip, the terminal strip, the latter partially in section, and the surge diverter magazine shown in FIG. 1;

FIG. 3 is a side elevation of a sheet-metal trough of a first embodiment, formed from two earthing strips, showing one such strip completely, and the bottom fixing means for mounting and contacting the screened end of the lead-in cable;

FIG. 4 is a plan view of the sheet-metal trough shown in FIG. 3;

FIG. 5 is a side elevation of a modified example of the trough shown in FIGS. 3 and 4, but in which the bunch of wires with the screening removed is passed through a wide borehole in the bottom wall of the trough;

FIG. 6 is a plan view of the trough shown in FIG. 5;

FIG. 7 is a plan view of a part of a distribution box showing the construction and arrangement of another embodiment of another sheet-metal trough between two adjacent bays, such trough being used not only to mount the terminal strips and earth the said magazine, but also as a cable guide duct by means of cable guide hooks, and FIG. 8 is an enlarged scale view of the hooks shown in FIG. 7 in elevation.

FIG. 9 is a cross-sectional view of the hook of FIG. 8 taken along the line 9—9 in the direction indicated by the arrows.

Referring to FIGS. 1 and 2, a line telecommunications cable end system, more particularly for installation in a rack or the like, e.g. a housing, for supporting and fixing the cable end where it is lead in, and for mounting terminal and/or isolating strips comprises at least one pair of parallel earthing strips 1, 1', spaced apart by the amount a (FIG. 7) and having a row of tags 1d formed on the top and extending through the end face of a corresponding number of terminal or isolating strips 2 having LSA contacts, the tags being lengthened to an extent such that they can also contact supplementary equipment fitted thereto, e.g. a surge diverter magazine 7.

Above the beveled entry portion 30a' of guide slot 30a (see bottom part of FIG. 2) each tag 1d and 1d' on the earthing strip 1, 1' extending through the end face of the strips 2 has a cut-out 1e and 1e' respectively engaging in a snap-action facility 30b of the strip 2 so that the top end of the tag 1d is fixed for engagement of the earth contact 7a (FIGS. 1 and 2) of the extra device 7. At the same time, the facility 30b presses the terminal strip 2 against the top edge of the earthing strip 1, 1' so that each terminal strip has a firm and secure fit on each side.

The same applies if the first or any opposite pair of tags 1d, 1d' is intended, not for a terminal strip 2, but for the snap-on securing of a support 9 for a name plate 10 (see top right of FIG. 3).

In the first (FIGS. 3 through 6) and second (FIG. 7) exemplified embodiments the earthing strips 1, 1' are interconnected by a common bottom wall 1f, forming a sheet-metal trough 1a of substantially U-shaped cross-section open at the end faces and the top.

The width a (FIG. 7) of this trough corresponds to the distance between the end face slots 30a, 30a' and their associated entry portions (bottom part of FIG. 2) of the terminal and/or isolating strips 2.

The substantially identical examples of the troughs 1a have at the bottom a fixing means 4 for mounting and contacting the screened end 3a of the lead-in cable 3. The only differences are a wide recess 1g (FIGS. 3 and 4) or a wide bore 1h (FIGS. 5 and 6) in the bottom wall 1f with internal edge protection for leading in the free cores 3b of the cable 3.

To simplify fixing on the rack 6 while maintaining security, a stiffening plate or support bar 5, 5' releasably connected to the bottom wall 1f of the two troughs 1a is provided on or near each of the ends thereof (see FIGS. 3 to 6).

The troughs 1a are thus in good electrically conductive contact with the terminal strips 2, the surge diverters 7 fitted thereon, and with the cable screen and, via the bars 5, 5', with screws or fixing hooks which are fitted on the rack 6 as shown in outline in FIG. 4.

To enable the cable to be straightened or set to an inclined position after it has been led in, the stiffening plate/support bar 5' has at the centre three boreholes 5a, 5b, 5c through which a fixing screw extends if required into a screwthreaded guide bar 3c fixed to the cable 3 at this point by means of adhesive tape 3d.

Although not shown in the drawing, it is possible for the earthing bars 1, 1' to be fitted with the spacing a on the stiffening plates/support bars 5, 5', thus forming a frame which is open to the rear. This enables the cable end or bunch of cable cores to be run in a different way from that indicated hereinbefore.

According to the fourth exemplified embodiment, the earthing strips 1, 1' are connected by a common bottom wall 1f' at the spacing b, where b<a, so as to form a sheet-metal trough 1b of U-shaped cross-section open at the ends and the top, this trough connecting each pair of adjacent strips 2, 2' in adjacent bays of a cable distribution box (FIG. 7).

The troughs 1b are fixed to the rack 6 at the ends, the cable 3 having the contact means for the cable screen 3a at one of these points (FIG. 7) so that the trough, rack and cable screen are directly interconnected electrically.

Since in this embodiment the troughs 1b can also be used for cable guidance, cable guide hooks 8 for the cables extending from the terminal strip 2 which can be fitted between the tags 1d are disposed on the top edge of the trough 1b (see FIGS. 7, 8 and 9).

For identification purposes, one pair of tags 1d, 1d' is provided for the snap-on fixing of a support 9 with a name plate 10.

Cable supports 28' may be provided on terminal strips 2 for incoming cable cores, and cable supports 28a, 28a' may be provided on terminal strips 2 for outgoing jumper wires.

We claim:

1. A line telecommunications cable end system adapted for supporting and fixing a lead-in cable end and also adapted for connecting terminal and/or isolating strips thereto, said cable end system comprising at least one pair of parallel earthing strips spaced a distance equal to the distance between end faces of said terminal and/or isolating strips, each earthing strip having a row of elongated tags formed integrally on the top surface, each said tag being adapted to extend through one of the end faces of a corresponding number of terminal and/or isolating strips with LSA contacts, the length of each said tag being such that it is also adapted to contact any fitted extra equipment such as a surge diverter.

2. A cable end system according to claim 1 characterised in that each tag on the earthing strips adapted to extend through the end face of the terminal and/or isolating strips has an enclosed cut-out, said cut-out engaging in a snap action device of the terminal and/or isolating strips so that the top end of the tag is fixed for engagement with the earth contact of the extra equipment.

3. A cable end system according to claim 1 or 2 characterised in that the pair of earthing strips is connected by a common bottom wall to form a sheet-metal trough open at the end faces and top.

4. A cable end system according to claim 3 characterised in that the width of the sheet-metal trough corresponds to the distance between the end faces of the terminal and/or isolating strips.

5. A cable end system according to claim 4, characterized in that the trough has at the bottom a fixing means for mounting and contacting the end of the lead-in cable and a wide opening in the bottom wall with internal edge protection to receive the free cores of the cable.

6. A cable end system according to claim 5 characterised in that a stiffening plate/support bar is releasably connected to each end face of the common wall of the sheet metal trough and is disposed adjacent to its associated trough end face.

7. A cable end system according to claim 6, characterised in that the stiffening plate/support bar has at the centre three boreholes through which a fixing screw optionally extends into a screwthreaded guide bar fixed on the cable at this point by means of an adhesive tape.

8. A cable end system according to claim 6, characterised in that the earthing strips are fitted on each of the the stiffening plates/support bars and thus form a frame open at the rear.

9. A cable system according to claim 1 characterised in that the earthing strips are separated by a common bottom wall formed as a sheet-metal trough open at the end faces and top, said trough connecting each pair of adjacent earthing strips adapted to be disposed in adjacent bays of a cable distribution box.

10. A cable end system according to claim 9 characterised in that the sheet-metal trough is fixed at the end face to a rack, the cable has contact means for a cable screen at one of the end faces of said trough so that the trough, rack and cable screen are adapted to be directly interconnected electrically.

11. A cable end system according to claim 9 characterised in that a row of cable guide hooks may be fitted to the top edge of the sheet metal trough between the tags.

12. A cable end system according to claim 8, characterised in that one pair of tags is adapted for snap-on fixing of a support with a name plate.

13. A cable end system according to claim 9, characterised in that one pair of tags is adapted for snap-on fixing of a support with a name plate.

* * * * *